Oct. 9, 1928.　　　　　　　　　　　　　　1,686,835
R. D. PIKE ET AL
PROCESS FOR PRODUCING POTASSIUM SALTS AND BY PRODUCTS
Filed May 25, 1927
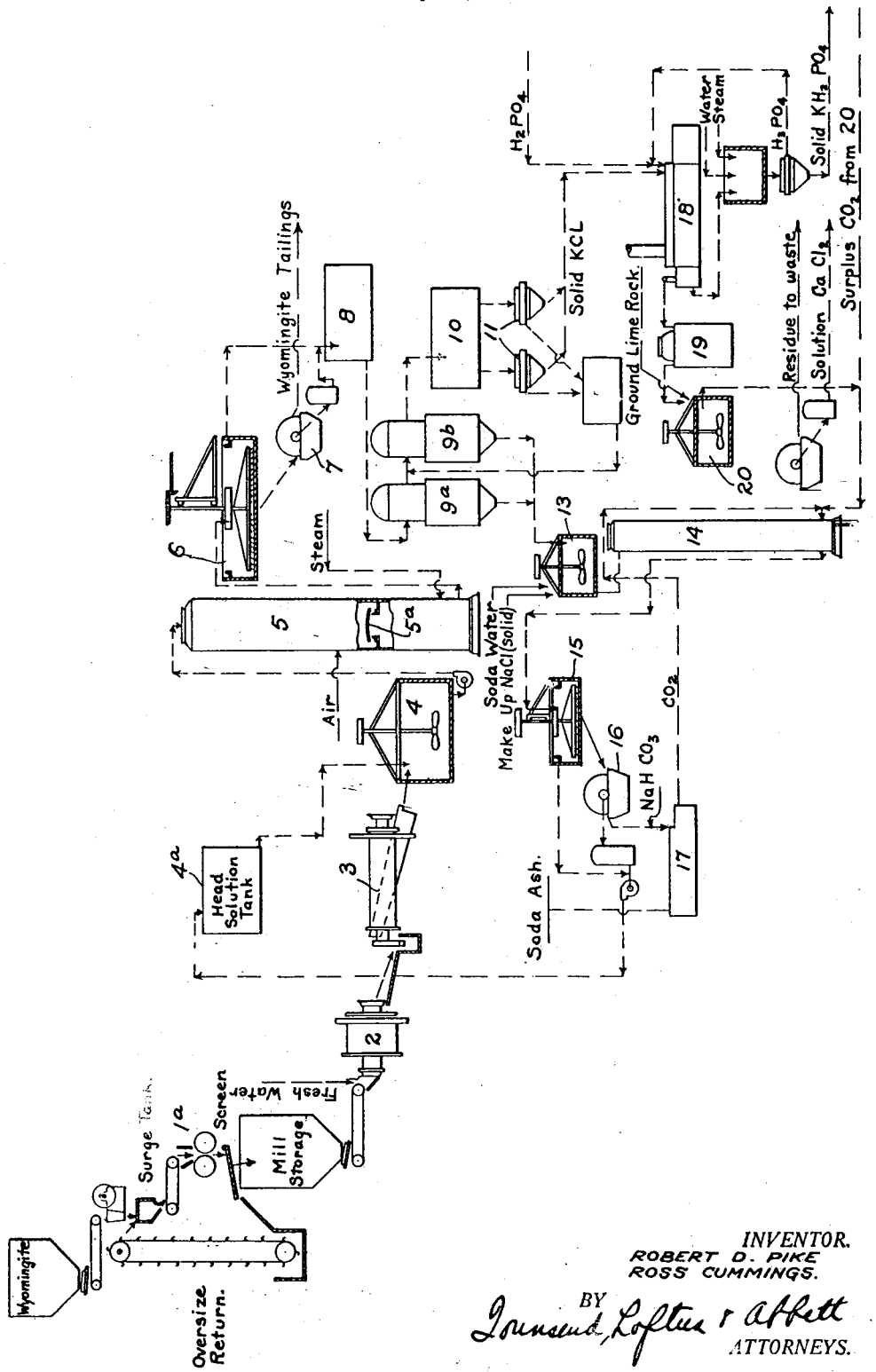
INVENTOR.
ROBERT D. PIKE
ROSS CUMMINGS.
BY
ATTORNEYS.

Patented Oct. 9, 1928.

1,686,835

UNITED STATES PATENT OFFICE.

ROBERT D. PIKE, OF PIEDMONT, AND ROSS CUMMINGS, OF BERKELEY, CALIFORNIA; SAID CUMMINGS ASSIGNOR TO SAID PIKE.

PROCESS FOR PRODUCING POTASSIUM SALTS AND BY-PRODUCTS.

Application filed May 25, 1927. Serial No. 194,226.

This invention relates to a process for producing potassium phosphate and muriate from wyomingite or the like, and from phosphoric acid. In an application filed of even date herewith we disclose a process for the extraction of potassium from silicate rocks, such as wyomingite, which is a potash silicate mineral occurring in large deposits in Wyoming. In said co-pending application we subject the ground wyomingite to the action of a salt solution and steam pressure, and obtain potassium chlorid. In the present process, we employ a brine solution containing sodium carbonates in the treatment of a similar material, and obtain potassium phosphates and muriate of potash.

A flow sheet illustrative of one manner of carrying out our process is shown in the accompanying drawing.

The wyomingite is passed through a primary crushing plant, 1 and 1a, and then through a wet ball mill 2, and wet tube mill 3, in series. The thick slurry in which the wyomingite is ground so that substantially all will pass a 200 mesh sieve, then goes to the mixing tank 4, where the proper amount of salt solution is added from the head solution tank 4a. If desired, the wyomingite may be ground in dry mills, in which case the dry powder goes to the mixing tank 4.

This solution is prepared as will be described later, and contains about 1% of soda as bicarbonate, which has a favorable action in assisting the extraction of the potash. The constituents of the finished slurry in tank 4 are about as follows: 1,000 tons wyomingite, 333 tons salt, 1,250 to 2,500 tons water, and 17 tons sodium bicarbonate.

This slurry is pumped to the top of a tower 5, which is kept filled with liquid, and is preferably from 100 to 125 feet high. A temperature corresponding to the hydrostatic head at the bottom is maintained by injecting steam into the bottom of the tower. The tower is provided with overlapping perforated baffles 5a, and as the steam flows up through these the mixture is agitated. Agitation is further assisted by compressed air, which is pumped into the tower about midway the height. The finished slurry flows out of the bottom of the tower and goes to a thickener 6, the underflow of which passes through a filter 7. The overflow from the thickener, and clarified liquor from the filter, go to a storage tank 8, and thence to evaporators 9a, 9b, where surplus solid NaCl is salted out. The mother liquor from the evaporators goes to a crystallizer 10, where it is cooled, and crystals of KCl are deposited, which are recovered in the centrifugal extractors 11. The wash water and mother liquor taken out in the extractors goes back to the evaporator circuit. The solid KCl is then treated with phosphoric acid in any suitable form of furnace, 18, in accordance with the reaction:

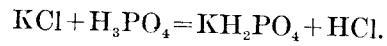
$$KCl + H_3PO_4 = KH_2PO_4 + HCl.$$

The HCl is recovered in 19, and applied to limerock in 20, thus:

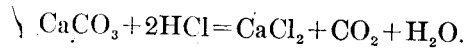
$$CaCO_3 + 2HCl = CaCl_2 + CO_2 + H_2O.$$

The $CO_2$ gas, recovered from this reaction, is utilized as follows:

The solid salt which returns in circulation from evaporators 9a and 9b, together with the make-up salt, are dissolved in tank 13, in a natural brine available in Wyoming, which contains from 8% to 9% of normal sodium carbonate, and this solution is then introduced into the top of a tower 14, which is similar to tower 5, except that no steam is used, but the $CO_2$ from tank 20 is pumped into the bottom, and serves to convert the normal sodium carbonate into bicarbonate, which latter is insoluble except to the extent of about 1%, in the salt brine. The sodium bicarbonate becomes precipitated, and the underflow from tower 14 passes to a thickener 15, and then to a filter 16, where the sodium bicarbonate is recovered. If desired this latter may be furnaced to soda ash, in which case the $CO_2$ recovered from the furnace 17 may form a part of that introduced into the bottom of the tower 14. The overflow from thickener 15, and the clarified liquor from the filter 16, pass to the head solution tank, 4a.

By means of our invention we are able to produce potassium phosphate and muriate of potash from natural resources occurring in large abundance in the United States, more cheaply than has hitherto been possible to make these very valuable fertilizer salts.

The cheapness of the process results from the by-product recovery of sodium bicarbonate, and the high efficiency of extraction of potash from the wyomingite, which is assisted by the carrying in circulation in the extractive brines of a small percentage of bicarbonate of soda.

Wyomingite is a crystalline mineral or a mineral in a crystalline form.

Having thus described our invention, what we claim as new and desire to secure by Letters Patent is:

1. The process of extraction of potash salts from wyomingite and the like, which consists in fine grinding and treating the pulp under heat and pressure with a solution of common salt containing not to exceed 1% of bicarbonate of sodium.

2. The process of extracting potash salts from silicate rocks, consisting of grinding the silicate rock and forming a pulp thereof by the adding of a solution of common salt containing a small percentage of bicarbonate of sodium.

3. The process of producing potassium phosphate and muriate from wyomingite, which consists of fine grinding the wyomingite, forming a pulp thereof with a solution of brine and bicarbonate of sodium, subjecting the pulp to heat and pressure, recovering potassium chloride from the pulp so treated, and treating the potassium chloride with phosphoric acid in a furnace, to produce potassium phosphate and hydrochloric acid.

4. The process of producing potassium phosphate and muriate from wyomingite, which consists of fine grinding the wyomingite, forming a pulp thereof with a solution of brine and bicarbonate of sodium, subjecting the pulp to heat and pressure, recovering potassium chloride from the pulp so treated, treating the potassium chloride with phosphoric acid in a furnace, to produce potassium phosphate and hydrochloric acid, and thereafter applying the hydrochloric acid to lime rock for the production of calcium chloride and $CO_2$ gas.

5. The process of producing potassium phosphate and muriate from wyomingite, which consists of fine grinding the wyomingite, forming a pulp thereof with a solution of brine and bicarbonate of sodium, subjecting the pulp to heat and pressure, recovering potassium chloride from the pulp so treated, treating the potassium chloride with phosphoric acid in a furnace, to produce potassium phosphate and hydrochloric acid, thereafter applying the hydrochloric acid to lime rock for the production of calcium chloride and $CO_2$ gas, and utilizing the $CO_2$ gas for the conversion of a normal sodium carbonate into sodium bicarbonate.

6. The process of extraction of potash salts from wyomingite and the like which consists in preparing a common salt solution for treating the wyomingite by dissolving salt in a brine containing sodium carbonate, and treating the resulting solution with $CO_2$ gas to precipitate all but a small part of the sodium carbonate as bicarbonate, grinding and treating the ground material under heat and pressure with said solution, removing the solids from the liquid, evaporating the latter for crystallization of common salt, and cooling the concentrated liquor for production of potassium chloride.

ROBERT D. PIKE.
ROSS CUMMINGS.